June 5, 1951  J. NAAB  2,555,809

COMPRESSOR

Filed March 2, 1945

INVENTOR
*Julius Naab.*
BY
HIS ATTORNEY.

Patented June 5, 1951

2,555,809

UNITED STATES PATENT OFFICE 2,555,809

COMPRESSOR

Julius Naab, Easton, Pa., assignor to Ingersoll-Rand Company, New York, N. Y., a corporation of New Jersey Application March 2, 1945, Serial No. 580,513

4 Claims. (Cl. 230—187)

This invention relates to compressors, and more particularly to compressors of the multi-cylinder reciprocatory piston type.

One object of the invention is to minimize the distance between the bearings lying on opposite sides of the crank portion of the compressor shaft.

Another object is to reduce the number of bearings required on a crank shaft serving to actuate a plurality of pistons.

Still another object is to minimize the weight of the crank shaft without sacrificing rigidity of its crank portion.

Other objects will be in part obvious and in part pointed out hereinafter.

Figure 1:
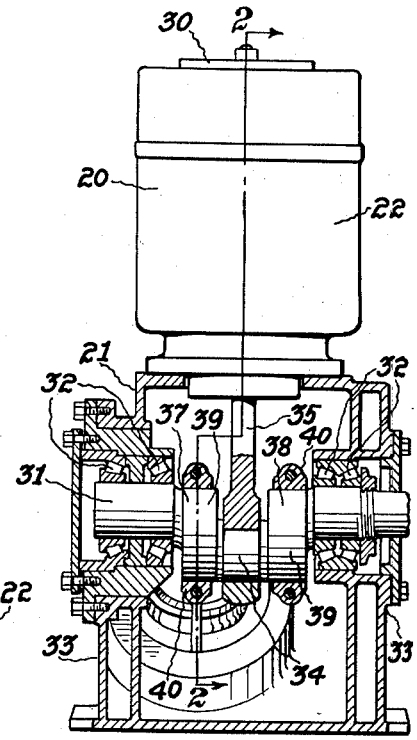
Figure 3:
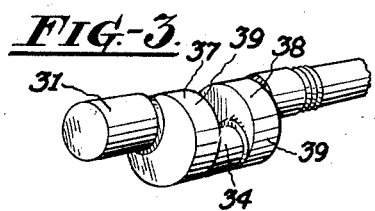
Figure 2:
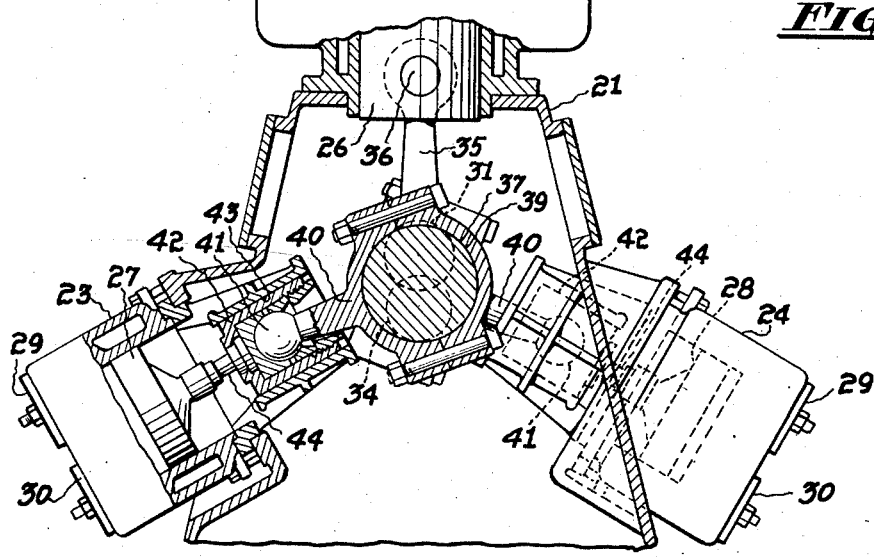

In the drawings accompanying this specification and in which similar reference numerals refer to similar parts, Figure 1 is an elevation, partly broken away, of a multi-cylinder compressor having the invention applied thereto, Figure 2 is an elevation, partly in section, taken through Figure 1 on the line 2—2, and Figure 3 is a perspective view of the compressor crank shaft.

Referring more particularly to the drawings, 20 designates the compressor in its entirety, and 21 a housing supporting radially arranged cylinders 22, 23 and 24 that may be secured to the housing 21 in any well known manner.

In the form of compressor selected to illustrate a practical embodiment of the invention, the first stage of compression is effected in the cylinder 22 and the final stage in the cylinders 23 and 24 by the pistons 26, 27 and 28, respectively. The cylinders are provided with the usual inlet and outlet valve mechanisms (not shown) for controlling the admission into and the exhaust of fluid from the cylinders, the positions of such valve mechanisms being indicated by plates 29 and 30, respectively.

The crank shaft 31 of the compressor serving to impart reciprocatory movement to the pistons is journalled in anti-friction bearings 32 disposed in the opposed walls 33 of the housing 21. Its crank pin 34 is connected to a rod 35 the opposite end of which is connected to the piston 26 by a wrist pin 36. The crank pin 34 may be formed integrally with the shaft 31 as may also be the crank webs 37 and 38 which lie adjacent the anti-friction bearings and, in accordance with the practice of the invention, are of cylindrical shape and their peripheral surfaces 39 are positioned eccentrically with respect to the axis of the shaft. These surfaces 39 act as bearings for the ends of connecting rods 40 serving to impart reciprocatory movement to the pistons 27 and 28 and are preferably only of slightly greater width than the bearing portions of the connecting rods wherein they are arranged.

The opposite ends of the connecting rods may be operatively connected to the pistons 27 and 28, as for example, by ball and socket connections 41 in crossheads 42 slidable in ways 43 and connected to the pistons 27—28 by rods 44.

In practice, the present invention has been found to be highly desirable in apparatus of the character to which it pertains. By utilizing the crank webs of the drive shaft as eccentrics for imparting reciprocatory movement to certain of the pistons of a multi-cylinder compressor, the unsupported portion of the shaft lying between the bearings may be of considerably less length than in structures providing separate crank pins for each connecting rod. The number of bearings may, moreover, be materially reduced, as may also be the weight of the crank shaft.

A further highly desirable advantage is that a crank shaft constructed in the manner described and having only one crank pin is particularly suited for use in multi-cylinder compressor for operating the pistons at different speeds and lengths of stroke, it being merely necessary to construct the crank webs of a suitable diameter and off-set them in the required degree with respect to the shaft.

I claim:

1. A compressor comprising a casing having a plurality of cylinders, reciprocatory pistons in the cylinders, a shaft in the casing having a crank pin, a web to connect the crank pin to the shaft and having a cylindrical bearing surface on its periphery arranged eccentrically with respect to the shaft, a transmission rod for one piston connected to the crank pin, and a transmission rod for another piston connected to the bearing surface.

2. A compressor comprising a casing having a plurality of cylinders, reciprocatory pistons in the cylinders, a shaft in the casing having a crank pin, a cylindrical crank web positioned eccentrically on the shaft, a transmission rod for one piston connected to the crank pin, and a transmission rod for another piston having a bearing to engage the peripheral surface of the crank web.

3. A compressor comprising a casing having a plurality of cylinders, reciprocatory pistons in the cylinders, a shaft in the casing, a crank pin, cylindrical crank webs to connect the crank pin to the shaft and being positioned eccentrically with respect to the shaft, a transmission rod for one piston connected to the crank pin, and transmission rods for other pistons having bearings to engage the peripheral surfaces of the crank webs.

4. A compressor comprising a casing having a plurality of cylinders, reciprocatory pistons in the cylinders, a shaft in the casing having a crank pin, crank webs to connect the crank pin to the shaft and having cylindrical bearing surfaces on their peripheries arranged eccentrically with respect to the crank shaft, bearings for the crank shaft adjacent the crank webs, a transmission rod for one piston connected to the crank pin, and transmission rods for other pistons having bearings for cooperation with the cylindrical bearing surfaces of the crank webs.

JULIUS NAAB.

REFERENCES CITED

The following references are of record in the file of this patent:

UNITED STATES PATENTS

| Number | Name | Date |
|---|---|---|
| 677,503 | Francke | July 2, 1901 |
| 1,073,337 | Fairhurst | Sept. 16, 1913 |
| 1,242,276 | Ver Planck | Oct. 9, 1917 |
| 1,487,770 | Tuttle | Mar. 25, 1924 |
| 1,813,128 | Stoesling | July 7, 1931 |
| 1,846,655 | Rayfield | Feb. 23, 1932 |
| 2,370,760 | Towler et al. | Mar. 6, 1945 |

FOREIGN PATENTS

| Number | Country | Date |
|---|---|---|
| 826,278 | France | Mar. 28, 1938 |